United States Patent [19]

Brooks

[11] Patent Number: 4,849,191
[45] Date of Patent: Jul. 18, 1989

[54] ECONOMICAL, SAFE, UNSUPERVISED METHOD FOR IN-VESSEL REGENERATION OF IRON-OXIDE SPONGE USED IN WASTEWATER-TREATMENT-PLANT DIGESTER-GAS SCRUBBERS

[76] Inventor: Kirtland Brooks, 3483 Golden Gate Way, Number 13,, Lafayette, Calif. 94549

[21] Appl. No.: 918,017

[22] Filed: Oct. 14, 1986

[51] Int. Cl.$^4$ ............................................. B01D 53/34
[52] U.S. Cl. ................................................... 423/231
[58] Field of Search ........................................ 423/231

[56] References Cited

U.S. PATENT DOCUMENTS

| | | | |
|---|---|---|---|
| 1,816,533 | 7/1931 | Huff et al. | 423/231 |
| 1,934,242 | 11/1933 | Smyly | 423/231 |
| 2,983,573 | 5/1961 | Moore et al. | 423/231 |
| 4,311,680 | 1/1982 | Frech et al. | 423/231 |
| 4,442,078 | 4/1984 | Jalan et al. | 423/231 |
| 4,722,799 | 2/1988 | Ashbrook et al. | 210/722 |

FOREIGN PATENT DOCUMENTS

| | | | |
|---|---|---|---|
| 483758 | 4/1938 | United Kingdom | 423/231 |
| 640065 | 7/1950 | United Kingdom | 423/231 |

Primary Examiner—John Doll
Assistant Examiner—Jeffrey Edwin Russel
Attorney, Agent, or Firm—Ashen Golant Martin & Seldon

[57] ABSTRACT

In wastewater treatment plants it is conventional to use gas "scrubbers" to remove hydrogen-sulfide gas from digester gas. The reactive scrubbing medium in such digester-gas scrubber vessels is generally iron-oxide "sponge," which is exhausted in use and which is both difficult and dangerous to regenerate. In accordance with the present invention, the spent iron-oxide sponge is immersed in liquid—by filling the scrubber vessel with the liquid—and a regenerating gas is then bubbled through the liquid and the iron-oxide sponge together. The liquid may be water, and the regenerating gas may be air or pure oxygen. The liquid absorbs heat from the regeneration reaction and conducts it out of the iron-oxide medium, eliminating the danger of combustion or explosion without impeding the progress of the reaction. The regenerating gas is applied through a diffuser structure from below. When regeneration is complete the liquid is drained from the vessel, but the flow of gas may be continued until the iron-oxide medium is dry. Scrubber operation may then resume.

6 Claims, 2 Drawing Sheets ("SCRUBBING")

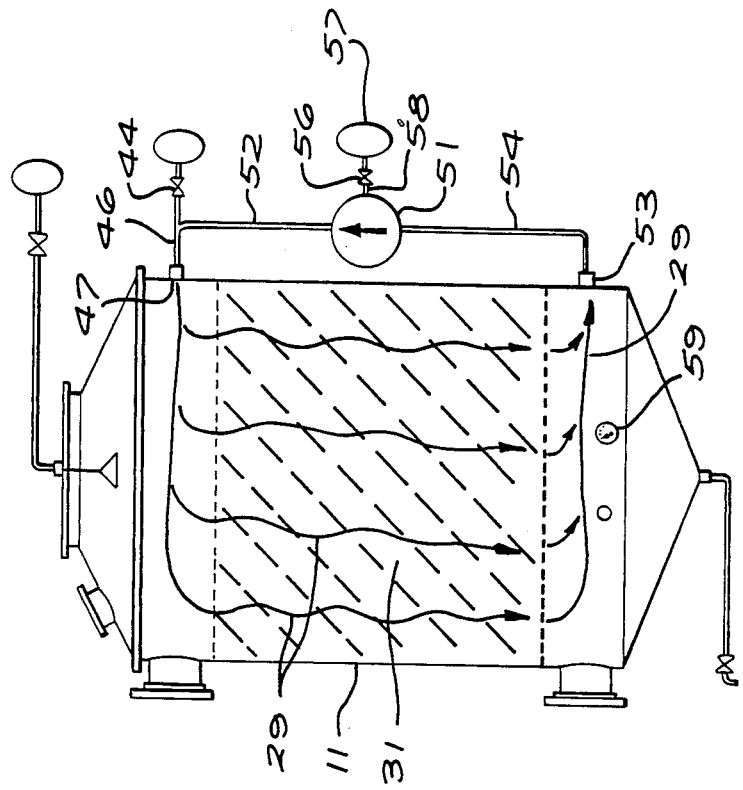
FIG. 4 PRIOR ART ("REGENERATION")
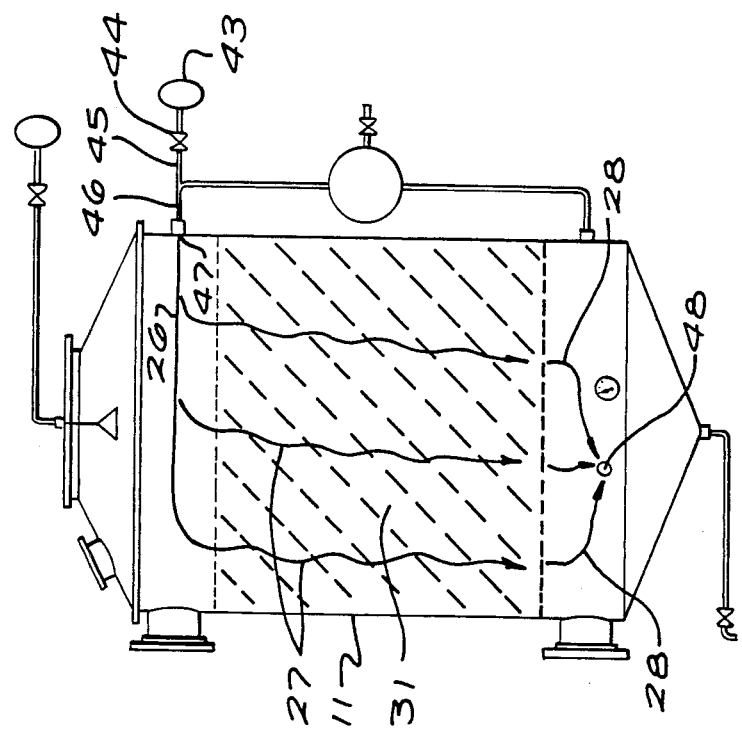
FIG. 3 PRIOR ART ("PURGING")

ECONOMICAL, SAFE, UNSUPERVISED METHOD FOR IN-VESSEL REGENERATION OF IRON-OXIDE SPONGE USED IN WASTEWATER-TREATMENT-PLANT DIGESTER-GAS SCRUBBERS

BACKGROUND

1. FIELD OF THE INVENTION

This invention relates generally to gas-purification or "scrubbing" equipment used in wastewater-treatment plants to clean so-called "digester gas," and relates more particularly to novel procedures and apparatus for safely and economically regenerating the chemically active medium (hydrated iron-oxide "sponge") used in such equipment.

2. PRIOR ART

"Digester gas" is a gaseous mixture produced by the anaerobic digestion of carbonaceous waste, particularly in wastewater treatment. Digester gas contains primarily methane gas—together with carbon-dioxide gas, a small quantity of hydrogen-sulfide gas, and in general trace amounts of various other gases.

The methane in the digester gas is valued as a fuel. The hydrogen sulfide, however, if left in the gaseous mixture would create a risk of pipeline and burner corrosion as well as other problems. Accordingly it is desirable to "scrub" the hydrogen sulfide from the mixture.

A permeable bed of wood chips coated with hydrated ferric oxide—often called "iron-oxide sponge"—is 8#commonly used as a medium to purify digester gas by removing the harmful hydrogen sulfide. This is accomplished by passing the digester gas downward through a vessel that contains the iron-oxide sponge, as shown in FIG. 2.

As illustrated, the vessel 11 has an inlet port 12 near the top for entry of the digester gas 21 to be purified, and an outlet port 13 near the bottom for exit of the "scrubbed" gas 25. A perforated platform 14 near the bottom of the vessel 11, just above the scrubbed-gas outlet 13, supports the purifying medium 31.

Thus the passage of the digester gas 21, 25 through the medium is downward as at 23, for collection as at 24 below the platform 14. This direction of gas flow is preferred, and to the best of my knowledge is used universally. This preference is not arbitrary, but rather arises from the following important rationale.

Upward gas flow would cause "channeling"—disruption and rearrangement of the medium 31 by the lifting effect of the upward stream, and then effective confinement of the flow to a relatively small number of well-defined, enlarged paths or channels in the medium. Channeling reduces drastically the total surface area to which each small volume of digester gas is exposed, and correspondingly reduces the effectiveness of the purification process.

Downward flow 21-23-24-25, by contrast, actually tends to gently compact the medium 31. Such compaction enhances the diffusion of gas flow throughout the medium 31 and with it the effectiveness of scrubbing. Consequently, piping the scrubber vessel 11 for downward flow is an important teaching of the prior art. #The top of the vessel 11 is provided with a small spray head 15, pipe 16 and valve 17 from a water supply 18—to facilitate application of a light misting spray 32 to moisten the medium 31 in preparation for use. It is well known that iron-oxide sponge 31 does not effectively combine with hydrogen-sulfide gas in the desired fashion unless moisture is present.

Once the scrubbing operation is begun, the sprayer valve 17 usually can be turned off, because enough moisture is carried into the vessel 11 with the digester gas 21 (from the wastewater) to ensure effective scrubbing. In fact, excess moisture is sometimes introduced in this way, and an additional very small amount of water is produced by the scrubbing reaction itself; hence a small drain 41 and drain valve 42 are generally provided at the bottom of the tank 11—only for removing the small amounts of excess moisture.

Even when it is used, the spray head 15 has very limited flow capacity: it is designed only to moisten. Accordingly, as an example, in a tank of a meter-and-a-half diameter and equal height the sprayer 15 and valve 17 are typically capable only of perhaps ten to fifteen milliliters per second—that is to say, on the order of one sixtieth of the tank capacity in an hour.

The digester gas 21, 23 is cleansed of hydrogen sulfide as the latter combines with the hydrated ferric oxide in the medium 31 to form a solid, ferric sulfide—that remains in the medium 31—and a very small amount of liquid, water. As previously mentioned, the water 33 if in sufficient quantity can trickle out through the drain 41 and valve 42. The remaining gas 24, 25 passes through and leaves the bed 31 and vessel 11 at the bottom port 13, for subsequent use as fuel.

This reaction eventually converts substantially all of the iron oxide to ferric sulfide, terminating the purifying ability of the medium 31. That is to say, when all of the available hydrated ferric oxide has reacted to form ferric sulfide, no further hydrogen sulfide is removed from the gas stream 21-23-24-25.

The scrubber 11 then must be removed from operation, and the spent medium 31 either replaced or regenerated. These alternatives are the focus of my invention.

It is possible to regenerate the iron-oxide sponge 31 in the vessel 11 by sweeping the vessel with an inert gas and a carefully controlled small amount of oxygen. The chemical environment should be neutral or alkaline.

In principle this procedure, which is well-known in the wastewater industry and in fact may appear in instructions furnished by some scrubber manufacturers, reverses the above-described reaction to reform hydrated ferric oxide. The reaction releases elemental sulfur, which remains in the medium as a solid.

Much or all of the solid sulfur remains in place on the medium, and tends to mask the subsequent operation of the medium. As a result, even under best theoretical conditions the regeneration can be performed only two or three times before the accumulation of sulfur renders the medium unusable permanently. The only option is then replacement of the medium. In practice, however, even this theoretical optimum is not realized, for the following reasons.

The regenerating process liberates heat and can cause spontaneous combustion. Considering the size of the equipment involved it will be understood that such a procedure may be dangerous in the extreme. The process therefore requires constant and vigilant monitoring over a twenty-four-hour period or longer, and is unforgiving of human error.

Consequently many or all operators elect to forego the process entirely. Such operators either use an even more time-consuming and costly purification procedure or replace the iron-oxide sponge with new material.

The more time-consuming procedure is to remove the spent medium entirely from the vessel, spread the medium out loosely on ground or pavement to a depth of a few inches keep it moist, and wait a few days for natural air circulation through the medium to effect regeneration.

That alternative procedure is costly and time consuming, but at least safe. The same may be said of complete replacement with new iron-oxide sponge.

In order to better appreciate my invention it will be helpful to have a somewhat more detailed understanding of the prior-art in-tank regeneration process—although, as just explained, it is seldom or never used.

In the prior-art process the flow of digester gas is halted, and as shown in FIG. 3 the digester-gas mixture is purged from the vessel with an inert gas such as carbon dioxide or nitrogen. A source 43 of such gas is connected to a valve 44 and suitable piping 45, 46 to an inlet 47 near the top of the vessel 11. The inert gas 26 is passed as at 27 through the bed 31 from above, sweeping digester gas out of the bed 31 for collection as at 28 and exit through a purge port 48 near the bottom.

When substantially all the digester gas is removed, the valve 44 is closed, and a pump 51 is actuated to recirculate the inert gas through the bed—still from above—as shown in FIG. 4. The inert gas is drawn from the bottom of the vessel 11 through a small outlet 53 and through a pipe 54 into the pump 51. From the pump the gas passes through pipes 52, 46 to a gas inlet 47 and thereby back into the tank 11.

Then a valve 56 is opened to admit a small stream of air from ambient or from any other appropriate source 57 through piping 58 into the pump 51 or otherwise into the recirculating gas stream. This admixture forms a regenerating gas 29, also passed through the medium downward—again, to avoid channeling during the regeneration process itself, or disruption of the medium 31 that could produce channeling later when the scrubber is returned to service.

Because the chemical reaction of oxygen and ferric sulfide to reform hydrated ferric oxide and elemental sulfur is exothermic, the temperature of the gas stream will rise. The temperature rise must be restricted by throttling back the air-injection valve 56. A thermometer 59 is provided for monitoring the temperature, which should be maintained below 120° F.

In the event that the temperature rises out of control, the water of hydration is removed from the hydrated ferric oxide above 150° F. At 212° F. steam is produced, driving off moisture, and at approximately 700° F. the kindling temperature of the wood-chip substrate is reached.

In such a situation, as air is present, burning results. This juncture may be reached abruptly and—with due regard to the character of combustion in a closed vessel it is not unrealistic to say—explosively.

If the operator succeeds in avoiding such exigencies, continuously providing the maximum amount of air consistent with restraining the temperature, the regeneration procedure can be expected to require up to thirty-six hours. The process may be suspended from time to time by repurging the vessel 11 with inert gas, but of course this extends the period in which the scrubber is out of service.

Regeneration is complete when the temperature of the recirculating gas remains ambient and unaffected by the continued admission of air to the stream. As already noted, however, this procedure is virtually an abstraction since essentially all operators elect to remove the scrubber medium for regeneration, or simply to replace it.

From the foregoing it will be clear that prior-art processes and equipment fail to provide convenient, fast, economical and safe regeneration.

SUMMARY OF THE DISCLOSURE

My invention provides a method of regenerating and reusing a reactive scrubber medium that comprises a hydrated-ferric-oxide coating on wood chips, or iron-oxide "sponge," after the medium has been employed to extract hydrogen-sulfide gas from a gaseous mixture called "digester gas." The medium has been used to extract the hydrogen sulfide by forming with it a compound—ferric sulfide—that is bound to the residual medium. By "residual medium" I mean the substrate (wood chips) and any unused ferric oxide.

The method includes several steps, including immersing the used medium—that is to say, the ferric sulfide together with the residual medium—in a liquid. Another, subsequent step is bubbling through the liquid a regenerating gas that reacts with the bound ferric sulfide, dissociating the ferric sulfide to restore the hydrated ferric oxide on the medium.

The method also includes the later step of removing the liquid from the regenerated medium. The medium may then be reexposed to further quantities of the digester gas, to extract further quantities of hydrogen-sulfide gas from that gaseous mixture.

For the chemical system just described, ordinary clean water serves well as the liquid. As will be appreciated, this choice of liquid involves minimal cost—probably even less than the inert gases used in the theoretically available prior-art procedure. Other possibilities for choosing the liquid will be discussed below.

The reactive medium generally has been used in a vessel, and preferably all the steps of my novel method are performed while the material remains in the vessel. Consequently, after all the steps are complete the regenerated medium is in the vessel already, and remains there in readiness to be reexposed to the further quantities of the digester gas.

My invention also provides apparatus for extracting hydrogen-sulfide gas from digester gas—by bringing the digester-gas mixture into contact with a hydrated-ferric-oxide medium that forms with the hydrogen sulfide a compound, ferric sulfide, that is bound to the residual medium—and for regenerating the medium for reuse. The apparatus includes a vessel for containing the reactive medium.

The apparatus also includes some means for introducing the digester gas into the vessel—so that the hydrogen-sulfide gas can react with the reactive medium to form the bound ferric sulfide. For purposes of generality of expression, I shall call these means for introducing the digester gas the "inlet means."

As will shortly be seen, however, there are at least three different inlet means. Therefore to avoid confusion while maintaining generality I shall more specifically refer to the inlet means that I have just defined as the "first inlet means."

The vessel and the first inlet means are particularly configured and are otherwise adapted to provide intimate contact of the digester-gas mixture with the reactive medium.

My novel apparatus also has some means for drawing off from the vessel the portions of the digester gas that do not react with the reactive medium. These means, again for purposes of generality, I shall call the "outlet means."

In addition my new apparatus has some means for introducing a liquid into the vessel, to immerse the reactive medium. I shall refer to these means as the "second inlet means."

Furthermore the apparatus of my invention must have some means for introducing a regenerating gas into the vessel and into the liquid. These last-mentioned means I shall denote the "third inlet means."

My invention also includes some means for removing the liquid from the reactive medium. These "removing means" may simply include a gravity drain at the bottom of the vessel.

The foregoing may be a description of the apparatus of my invention in its most general terms. In addition to the features just enumerated, I prefer to provide the apparatus with certain additional features.

One such preferred feature is that the third inlet means should be substantially at the bottom of the vessel. It will be noted that this is exactly the opposite of the firm teaching of the prior art for location of air-introducing ports. More specifically, the third inlet means themselves include some means for distributing the regenerating gas generally across the bottom of the vessel to rise through the liquid.

Another preferred feature is that the second inlet means be sized and adapted to substantially fill the vessel with the liquid within a small fraction of one day.

Purely by way of example, for a vessel of one-and-a-half meter diameter and equal height, a flow rate of around a quarter liter to a half liter per second will readily fill the vessel in less than two hours (bearing in mind that a fraction of the vessel volume is occupied by the reactive material). As a matter of convenience I feel that the liquid supply should be sufficient to fill the vessel in less than four hours.

It will be understood that to practice my invention effectively it is not necessary to follow any particular theory that establishes a fine line of demarcation in the acceptable size of the water supply or in the acceptable range of filling time. The exemplary parameters just mentioned, however, plainly depart by well over an order of magnitude from the specifications noted earlier for a typical misting sprayer 15 (FIG. 2).

All of the foregoing operational principles and advantages of the present invention will be more fully appreciated upon consideration of the following detailed description with reference to the appended drawings, of which:

BRIEF DESCRIPTION OF THE DRAWINGS

FIGS. 2 through 4 have already been discussed, in the earlier "prior art" section of this document.

FIG. 2 is a drawing similar to FIG. 1, but illustrating prior-art apparatus in use for scrubbing. This drawing also serves as an illustration of the apparatus of my invention when in use for gas scrubbing—since with respect to that phase of use the operation of my invention is generally conventional.

FIG. 3 is a similar drawing illustrating prior-art apparatus in use for purging. In the prior art, purging is a step preliminary to regeneration.

FIG. 4 is a similar drawing illustrating prior-art apparatus in use for regeneration.

DETAILED DESCRIPTION OF THE PREFERRED EMBODIMENTS

Figure 2:
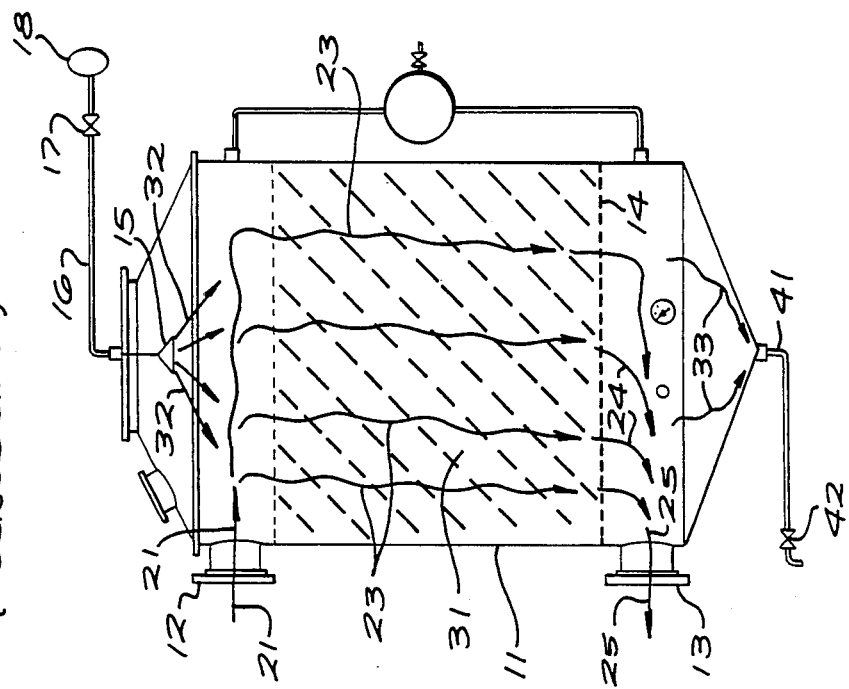
Figure 1:
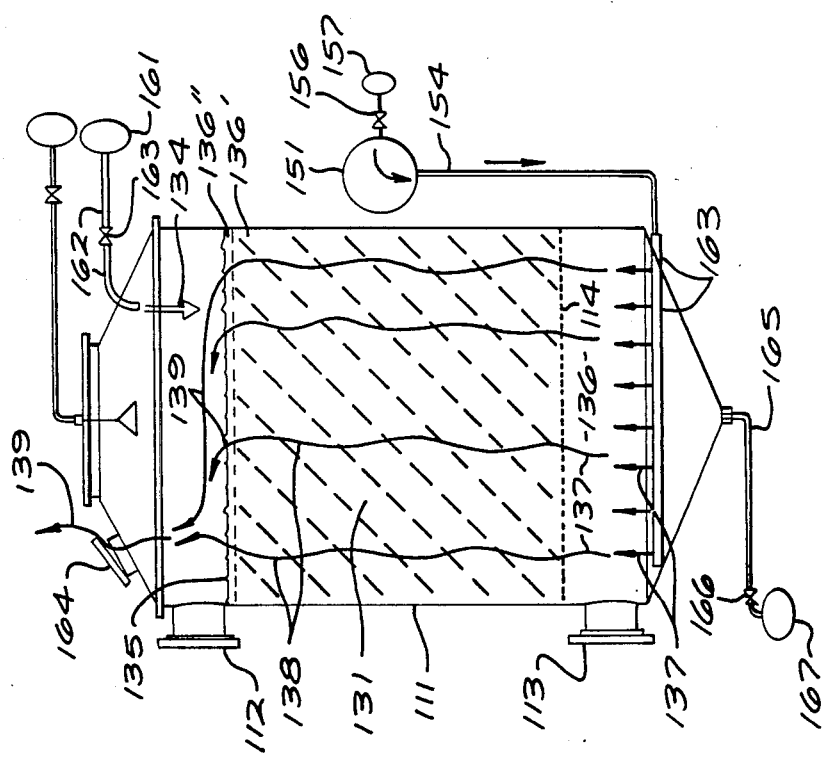
FIG. 1 is a generally schematic elevation, partly in section. It illustrates the apparatus of my invention in use for regeneration, and also for a step preparatory to regeneration.

In the practice of my invention as in the prior art, in preparation for regeneration the operator closes off the gas connections to and from the vessel, so that no digester gas is flowing through the inlet and outlet ports 112, 113. In addition the operator opens a handhole or other vent 164 at the top of the vessel.

As will be clear, the vessel piping can be arranged so that these two preliminary steps can be accomplished by operation of a single selector valve. (With some chemical systems, as will be appreciated y those skilled in the art, the vessel cannot be simply vented to ambient, but rather must be ducted from the vent to a suitable collecting point.)

Next the operator permits water 134 from a high-flow-rate source 161 to fill the vessel 111 through piping 162. To accomplish this the operator (or an automatic controller) opens a valve 163 in the piping 162, and leaves it open until water fills the vessel to a level 135 above the reactive medium 131 but below the effective height of the digester-gas inlet port 112.

In accordance with my invention, the vessel 111 must be of sufficient strength to withstand the water pressure at all points of contact. It will be understood that references to "water" in this portion of the present document may be taken to refer to aqueous solutions (or possibly even other liquids) that may be used instead.

When filling is complete, the volume of the vessel 111 between the effective bottom of the digester-gas inlet port 112 and the platform 114 is occupied jointly by the reactive medium 131 and the water 136. Above the water level 135 the vessel 111 is typically open to ambient and contains essentially air. Below the platform the vessel 111 contains water.

The water supply valve 163 is then closed, and a pump is operated to draw air from ambient—or any other suitable supply 157—into the vessel 111. If preferred for more rapid regeneration, pure or concentrated oxygen may be substituted for air: in such cases it will ordinarily be necessary to provide a supply valve 156 in the line from the source 157.

Air from the pump 151 passes into the vessel 111 through piping 154 and a bubbler or diffuser 163 near the bottom of the vessel 111. Preferably the diffuser 163 is below the platform 114 that supports the reactive medium 131, so that the incoming air 137 at first flows through only the water 136 below the platform 114.

Then the air 138 makes its way upward through the water 136' that is in the interstices of the medium 131. Next the air makes it way through the water 136" that is above the irregular top surface of the reactive medium 131. Eventually the air 139 leaves the top surfaces of the medium 131 and the water 135, escaping through the vent 164.

The bubbler or diffuser 163 may have either a plurality of orifices or a single extended, very narrow orifice, for distributing the incoming gas 137 generally across the area of the bottom of the vessel 111. As a result the rising air 138 within the medium 131 is distributed generally across the cross-sectional area of the medium 131.

Some of the oxygen in the air dissolves in the water 136, 136". The resulting thorough aeration of the water 136' exposes the reactive medium 131 to the dissolved oxygen in the water 136'. There then occurs the same chemical reaction as in conventional regeneration: ferric sulfide combines with oxygen to reform hydrated ferric oxide and elemental sulfur.

One crucial difference, however, is that the water absorbs the heat of reaction and conducts that heat very efficiently and effectively to the walls and base of the vessel. The vessel walls and base in turn similarly conduct the heat to the environment—that is, to the air around the vessel and to the air or ground beneath the vessel.

This single difference is of enormous importance, for it prevents the reaction from escalating due to increasing temperature Consequently, as long as the water level is maintained, there is no danger of combustion or explosion.

Aeration therefore requires no supervision, and can be continued for thirty-six hours or as required to complete the chemical reaction. Thereafter the operator drains the water from the vessel 111 through drain 165 and drain valve 166 to storage or disposal 167, while continuing to direct air through the reactive medium.

The operator continues this last step until all the surplus water has drained from the unit and the medium has been dried to the optimum extent for use in scrubbing gas. The scrubber may then be returned to service.

The procedure described may be used at least two or three times before the medium is cumulatively poisoned—primarily, it is believed, by accumulated elemental sulfur masking the reactive ferric oxide—and must be replaced. Even regeneration of each batch of hydrated ferric oxice two or three times, however, is important. Over the life of a wastewater treatment plant the resulting savings in labor, time, materials (the reactive medium) and money are very substantial.

In addition to the specific benefits described explicitly here, my invention paves the way for attainment of various other enhancements of either the scrubbing process or the regeneration process, or both—by providing an opportunity for contacting the ferric oxide or ferric sulfide with any number of different chemicals in liquid solution or in liquid form.

It is possible that important benefits may be obtained by including additives in the water that is used in the regeneration process. In principle it may even be possible to substitute nonaqueous liquids, although at this writing I understand that at least some water is needed to provide the water of hydration for the regenerated medium.

Any such additive or substitute—for whatever purpose used—must be either adequately nonreactive or in some appropriate way reactive with the ferric oxide. In addition, proper pH must be maintained to produce reactive and regenerable hydrated ferric oxide.

Reaction of the additive or substitute with the elemental sulfur, on the other hand, would not necessarily be objectionable, and could be extremely advantageous. Such a reaction, if it solubilized (as with an alkaline additive), colloidalized, or gasified the sulfur for later removal from the medium, could form a particularly valuable refinement of my invention. (A gaseous form of sulfur, after isolation and release during regeneration, could be collected in a smaller, separate chemical trap.)

By stabilizing the regeneration process thermally, my invention opens the way for a great variety of such refinements, whereby the medium could then be regenerated and reused many times rather than only twice or three times. Such enhanced operation is accordingly considered within the scope of the appended claims.

Absent such an advantage, however, cost considerations make water the most appropriate choice of liquids.

It will be understood that the foregoing disclosure is intended to be merely exemplary, and not to limit the scope of the invention—which is to be determined by reference to the appended claims.

I claim:

1. A method of regenerating and reusing a hydrated-ferric-oxide medium comprising hydrated ferric oxide bound to a substrate, that has been used to extract hydrogen-sulfide gas from digester gas by forming with the hydrogen-sulfide gas ferric sulfide that is bound to residual medium, comprising the steps of:

immersing the ferric sulfide and residual medium together in a liquid comprising water;

then bubbling through the liquid a regenerating gas that reacts with the ferric sulfide while the ferric sulfide remains bound to residual medium, dissociating the ferric sulfide to restore the hydrated ferric oxide, bound to the substrate, on the medium;

whereby the reaction of the regenerating gas with the ferric sulfide requires no supervision; and then removing the liquid from the hydrated ferric oxide;

whereby the hydrated ferric oxide, still bound to the substrate, may then be reexposed to further quantities of the digester gas, to extract further quantities of the hydrogen-sulfide gas therefrom.

2. The method of claim 1, wherein:

the hydrated ferric oxide is supported on a substrate that is generally nonreactive with the digester gas, with the hydrogen sulfide, and with the liquid.

3. The method of claim 1, wherein:

the hydrated ferric oxide is supported on a substrate comprising wood chips.

4. The method of claim 1, wherein:

the hydrated-ferric-oxide medium has been used in a vessel and;

all said steps are performed while the hydrated-ferric-oxide medium and the residual medium remain in the same vessel;

whereby after all said steps, the restored hydrated-ferric-oxide medium is and remains in the same vessel in readiness to be so reexposed to the further quantities of digester gas.

5. A method of regenerating and reusing a hydrated-ferric-oxide medium comprising hydrated ferric oxide bound to a substrate, that has been used to extract hydrogen-sulfide gas from digester gas by forming with the hydrogen-sulfide gas ferric sulfide that is bound to residual medium, comprising the steps of:

immersing the ferric sulfide and residual medium together in a liquid comprising water;

then bubbling through the liquid a regenerating gas that reacts with the ferric sulfide while the ferric sulfide remains bound to residual medium, dissociating the ferric sulfide in an exothermic reaction to restore the hydrated ferric oxide, bound to the substrate, on the medium, while the liquid absorbs and conducts away heat exothermically developed by said dissociating of ferric sulfide, said liquid being present in sufficient quantity to absorb and conduct away the heat effectively; and then removing the liquid from the hydrated ferric oxide;

whereby the hydrated ferric oxide, still bound to the substrate, may then be reexposed to further quantities of the digester gas, to extract further quantities of the hydrogen-sulfide gas therefrom.

6. A method of regenerating and reusing a hydrated-ferric-oxide medium comprising hydrated ferric oxide bound to a substrate, that has been used in a vessel to extract hydrogen-sulfide gas from digester gas by forming with the hydrogen-sulfide gas ferric sulfide that is bound to residual medium, comprising the steps of:

while the ferric sulfide remains bound to residual medium in the same vessel, immersing the ferric sulfide and residual medium together in a liquid comprising water, by admitting the liquid into vessel until the liquid level is at least substantially above the medium;

then, while the ferric sulfide remains bound to residual medium, bubbling through the liquid in the vessel a regenerating gas that reacts with the ferric sulfide, dissociating the ferric sulfide in an exothermic chemical reaction to restore the hydrated ferric oxide on the medium, while the liquid absorbs and conducts away heat exothermically developed by said dissociating of ferric sulfide; and then removing the liquid from the hydrated ferric oxide in a vessel;

whereby after all said steps, the hydrated ferric oxide is and remains in the vessel in readiness to be reexposed to further quantities of digester gas, to extract further quantities of the hydrogen-sulfide gas therefrom.

* * * * *